United States Patent [19]
Oyamada et al.

[11] Patent Number: 6,145,344
[45] Date of Patent: Nov. 14, 2000

[54] METHOD FOR THE PREPARATION OF A POROUS SILICA GLASS PREFORM FOR OPTICAL FIBERS

[75] Inventors: Hiroshi Oyamada; Hiroyuki Koide; Goh Ogino; Hideo Hirasawa, all of Gunma-ken, Japan

[73] Assignee: Shin-Etsu Chemical Co., Ltd., Tokyo, Japan

[21] Appl. No.: 08/284,902

[22] Filed: Aug. 2, 1994

[30] Foreign Application Priority Data

Aug. 26, 1993 [JP] Japan .................................. 5-211198

[51] Int. Cl.⁷ .............................................. C03B 37/018
[52] U.S. Cl. ................. 65/414; 65/414; 65/415; 65/17.4; 65/531
[58] Field of Search .................. 65/414, 415, 410, 65/17.4, 531, 176

[56] References Cited

U.S. PATENT DOCUMENTS

| | | | |
|---|---|---|---|
| 3,741,796 | 6/1973 | Walker | 65/17.4 |
| 4,378,985 | 4/1983 | Powers | 65/415 |
| 4,676,814 | 6/1987 | Ross | 65/414 |
| 4,726,827 | 2/1988 | Powers | 65/415 |
| 5,028,246 | 7/1991 | Sarkar | 65/414 |

FOREIGN PATENT DOCUMENTS

| | | | |
|---|---|---|---|
| 53-131053 | 11/1978 | Japan | 65/415 |
| 55-7508 | 1/1980 | Japan | 65/414 |
| 59-3259 | 2/1984 | Japan | 65/414 |
| 6-122528 | 5/1994 | Japan | 65/414 |
| 6-122529 | 5/1994 | Japan | 65/414 |

*Primary Examiner*—John Hoffmann
*Attorney, Agent, or Firm*—Reed Smith Shaw & McClay LLP

[57] ABSTRACT

Proposed is an improvement in the VAD process for the preparation of a porous silica glass preform for double-core optical fibers by using three oxyhydrogen flame burners installed one above the other in a flame hydrolysis chamber in which a porous silica glass body consisting of the center core portion formed by the lowermost burner, side core portion formed by the middle burner and the cladding layer formed by the uppermost burner is gradually pulled up as it grows under rotation. Different from conventional procedures in which the extension of the nozzle axis of each of the burners intersects with the rotation axis of the growing body, the extension of the nozzle axis of the middle burner for the side core is displaced in a horizontal direction by a limited distance not to intersect nor to be in parallel with the rotation axis in the invention. By this means, an improvement is obtained in the uniformity of distribution of the refractive index in the side core which otherwise is remarkably disordered.

2 Claims, 4 Drawing Sheets

DISTANCE FROM CENTER P

METHOD FOR THE PREPARATION OF A POROUS SILICA GLASS PREFORM FOR OPTICAL FIBERS

BACKGROUND OF THE INVENTION

The present invention relates to a method for the preparation of a porous silica glass preform for optical fibers or, more particularly, to a novel method for the preparation of a porous silica glass preform as a precursor of optical fibers of the double-core type by the so-called VAD method, in which silica soot, i.e. fine particles of silicon dioxide formed by the flame hydrolysis of a vaporizable silicon compound, is deposited on the porous body under growing to form a preform for double-core dispersion-shift optical fibers having a center core, side core and cladding layer.

A double-core optical fiber above mentioned has a cross section having three concentrical portions including an innermost circular center portion, called the center core, having a refractive index n1, a ring-wise intermediate portion, called the side core, formed on and around the center core and having a refractive index n2 which is smaller than n1 and an outermost ring-wise portion, called the cladding layer, formed on and around the side core and having a refractive index n3 which is smaller than n2. The porous silica glass preform as a precursor of such a double-core optical fiber also has a concentrically structured cross section consisting of three portions including the center core, side core and cladding layer. The porous silica glass preform having such a ternary structure is prepared usually by the so-called VAD method using three burners held one above the other, of which the first, i.e. lowermost, second, i.e. middle, and third, i.e. uppermost, burners each serve to form the center core, side core and cladding layer, respectively, by the flame hydrolysis of a vaporizable silicon compound such as silicon tetrachloride with or without admixture of respective dopants for the control of the refractive indices in an oxyhydrogen flame formed on the nozzles of the respective burners.

Namely, the starting portion of the center core of the porous preform is first formed on a rotating refractory base by the flame hydrolysis using the first burner and, as the center core portion grows, the refractory base is gradually pulled up to hang the growing center core portion having a refractive index of n1 in a vertical position. As the center core portion grows, the silica soot produced in the oxyhydrogen flame on the second burner above the first burner is deposited on and around the growing center core portion to form the side core portion having a refractive index of n2 so that the porous body consisting of the center core portion and the side core portion grows in the vertical direction. Further, the silica soot produced in the oxyhydrogen flame on the third burner above the second burner is deposited on and around the side core portion under growing to form the cladding layer having a refractive index of n3. In the arrangement of the three burners one above the other, it is usual in the prior art that the extension of the nozzle axis of each of the three burners intersects with the axis of rotation of the porous silica glass body under growing.

While it is a requirement in a double-core silica glass optical fiber that the distribution of refractive index within the side core portion is uniform making clear demarcations with the center core portion and with the cladding layer or, namely, the distribution curve of refractive index in a radial direction taken in a cross section of the optical fiber has an ideally stepwise profile making definite stages for the respective portions, a problem in the doublecore optical fibers in the prior art prepared from the porous silica glass preform obtained in the above described method is that the refractive index of the side core portion is not uniform making no definite demarcations with the center core portion and with the cladding layer so that the profile of the distribution curve of refractive index in a cross section cannot be stepwise, in particular, in the side core portion. Needless to say, various proposals and attempts have been made heretofore in order to obtain an ideally stepwise profile of the distribution curve of the refractive indices in a radial direction within a cross section of the optical fiber but none of the proposals and attempts has been fully successful.

SUMMARY OF THE INVENTION

The present invention accordingly has an object to provide a novel and improved method for the preparation of a porous silica glass preform as a precursor of double-core optical fibers of which the side core portion has a very uniform distribution profile of refractive index making clear and definite demarcations with the center core portion and with the cladding layer.

Thus, the present invention provides an improvement, in a method for the preparation of a porous silica glass preform as a precursor of double-core optical fibers concentrically consisting of a center core, a side core and a cladding layer by the flame hydrolysis of a vaporizable silicon compound with or without admixture of a dopant for the control of refractive index in oxyhydrogen flames formed on the nozzles of a lowermost burner, middle burner and uppermost burner, each burner being a concentrically multitubular burner comprising a center nozzle and at least one ring nozzle surrounding the center nozzle, one above the other, of which the lowermost burner serves to produce a silica soot which is deposited on and around the growing porous silica glass body under rotation around a vertical axis to form the center core, the middle burner serves to produce a silica soot which is deposited on and around the growing porous silica glass body for the center core to form the side core and the uppermost burner serves to produce a silica soot which is deposited on and around the growing porous silica glass body for the side core to form the cladding layer, which improvement comprises setting the middle burner for the side core at such a position that the extension of the nozzle axis does not intersect with the axis of rotation of the growing porous silica glass body with displacement of a distance defined by the value of X/D in the range from 0.01 to 0.5, in which D is the diameter of the ring nozzle of the concentrically multitubular middle burner, from which hydrogen gas is ejected, surrounding the center nozzle and X is the distance of the displacement of the nozzle axis of the middle burner in a horizontal direction perpendicular to each of the rotating axis of the growing porous silica glass body and the nozzle axis of the middle burner, the extension of the nozzle axis of each of the lowermost and uppermost burners intersecting with the axis of rotation of the growing porous silica glass body.

Figure 6:
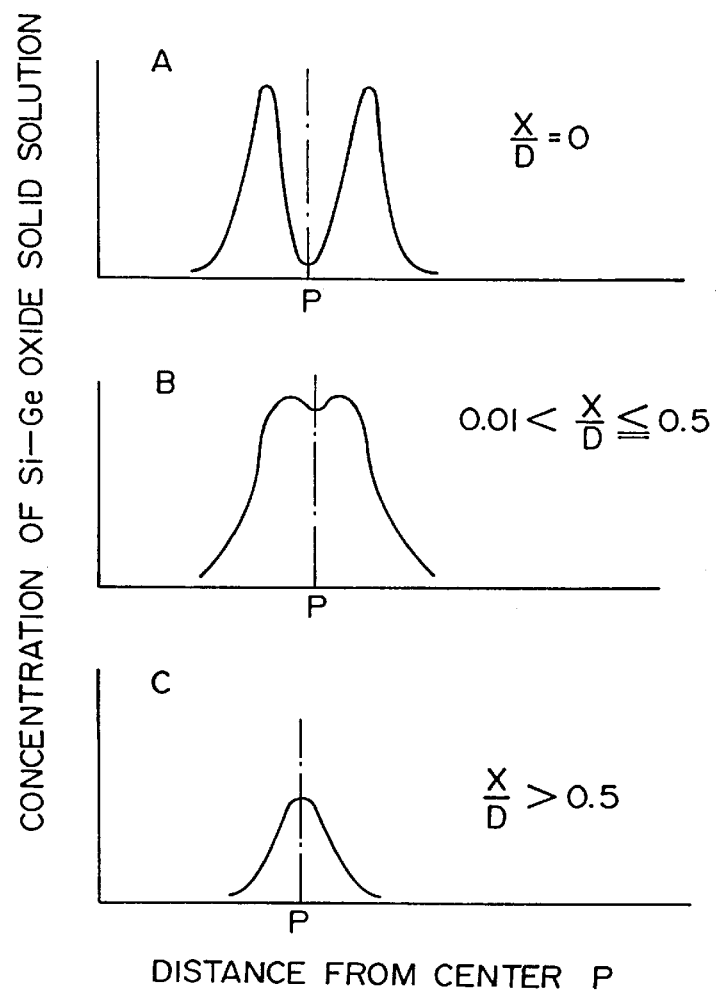

Graphs A, B and C of FIG. 6 are each a curve showing the distribution of silicon-germanium oxide solid solution within a silica-soot deposition surface.

Figure 7A:
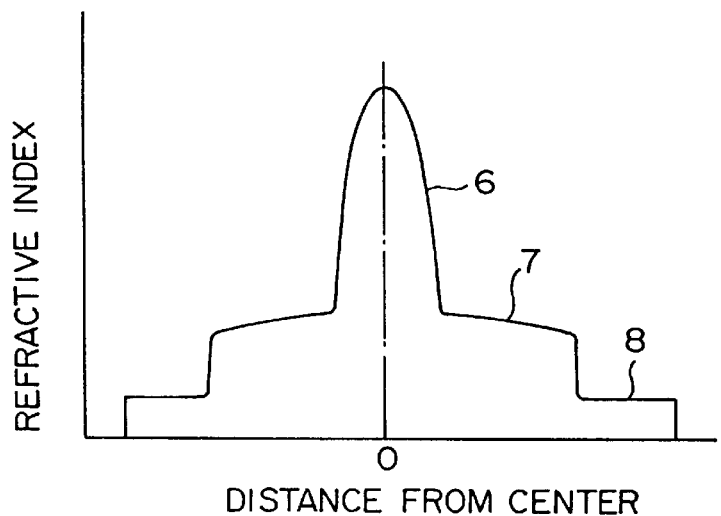
Figure 7B:
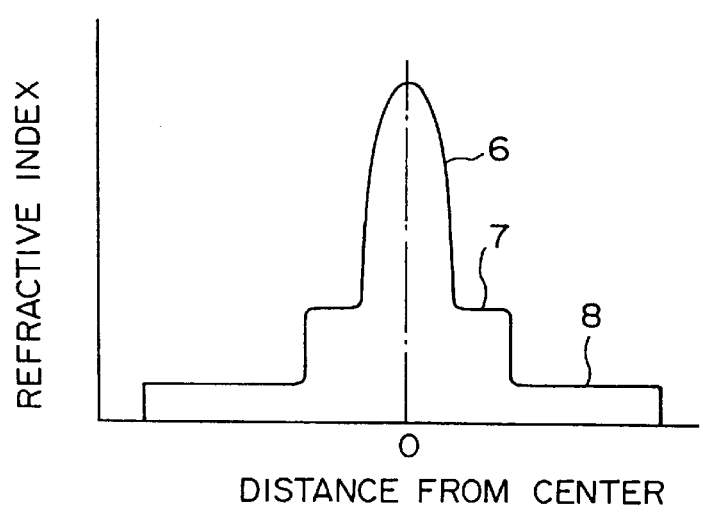

FIGS. 7a and 7b are each a graph of the distribution of the refractive index along a radial direction within a cross section of double-core optical fibers obtained in Example with a value of X/D in the range of 0 1 to 0.4 and in the range exceeding 0.5, respectively.

Figure 8:
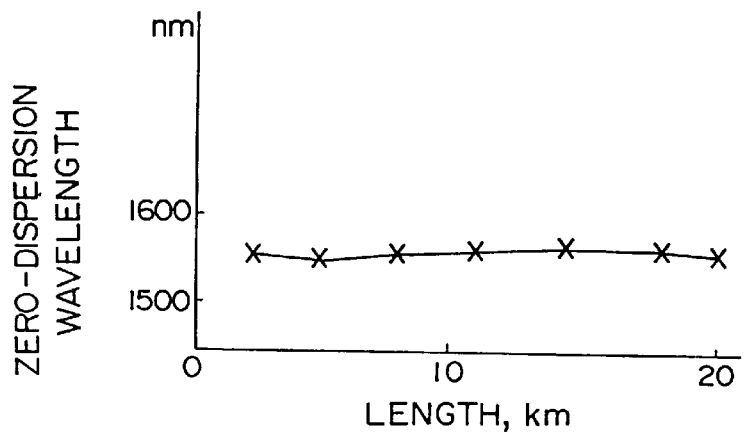

FIG. 8 is a graph showing the zero-dispersion wavelength of an optical fiber obtained in Example over a length of 20 km.

DETAILED DESCRIPTION OF THE PREFERRED EMBODIMENTS

Figure 1:
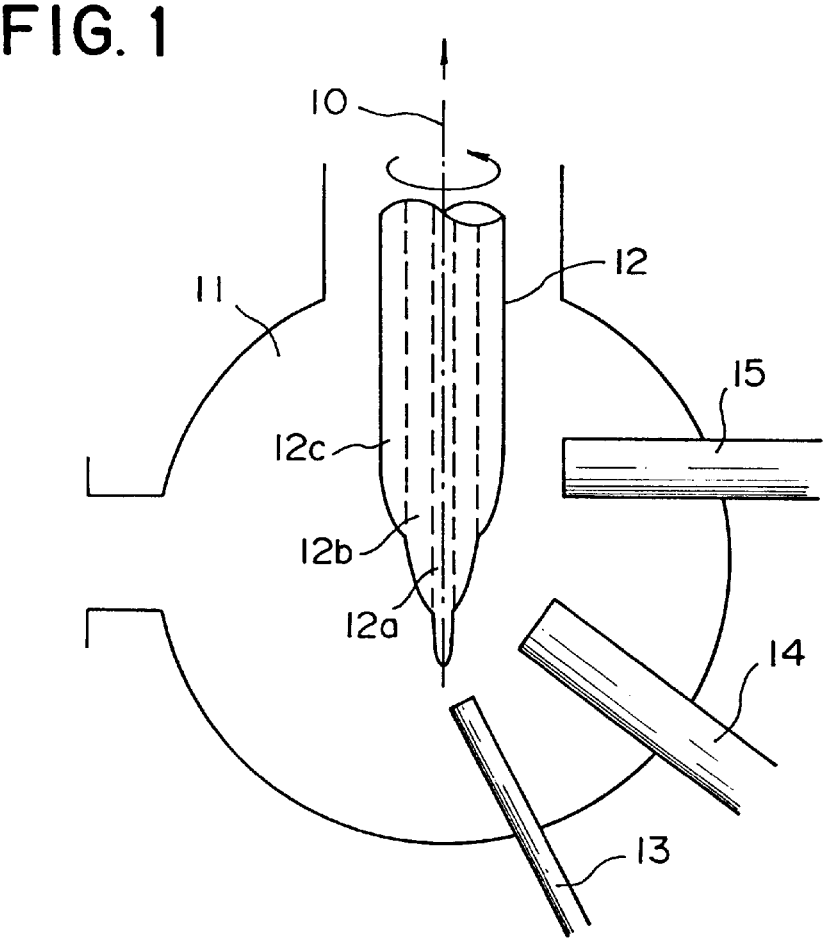
FIG. 1 is a schematic axial cross sectional side view of an apparatus for growing a double-core porous silica glass preform with three burners.

The basic procedure for the preparation of a porous silica glass preform as a precursor of double-core optical fibers is illustrated in detail by making reference to the accompanying drawing. FIG. 1 shows a schematic axial cross sectional view of an apparatus assembly for growing such a double-core porous silica glass preform consisting of a flame hydrolysis chamber 11 and three burners 13, 14 and 15. The lowermost burner 13 forms an oxyhydrogen flame on the nozzle thereof and a vaporizable silicon compound introduced into the burner 13 is flame-hydrolyzed in the oxyhydrogen flame to produce a silica soot which is deposited on a refractory base supported on the lower end of a shaft (not shown in the figure) rotating around a vertical axis 10 to form the center core 12a. As the deposition of the silica soot proceeds, the vertical shaft is gradually pulled up so that the center core portion 12a grows in a rod-like form.

Along with the growth of the center core portion 12a, the silica soot produced in the oxyhydrogen flame on the nozzle of the middle burner 14 is deposited on and around the rotating and growing center core 12a to form the side core portion 12b surrounding the center core 12a.

As the rod-like porous silica glass body consisting of the center core 12a and side core 12b grows, the silica soot produced in the oxyhydrogen flame on the nozzle of the uppermost burner 15 is deposited on and around the rotating and growing side core 12b to form the cladding layer 12c thus to complete the porous silica glass preform 12 consisting of the center core 12a, side core 12b and cladding layer 12c.

The three portions of the center core 12a, side core 12b and cladding layer 12c of the thus prepared porous silica glass preform 12 have refractive indices of n1, n2 and n3, respectively, having a relationship of n1>n2>n3. The refractive index of the respective portions 12a, 12b, 12c can be controlled by the admixture of the vaporizable silicon compound as the feed to the respective burners 13, 14, 15, respectively, with an appropriate dopant which increases or decreases the refractive index of the resultant silica glass.

Figure 2:
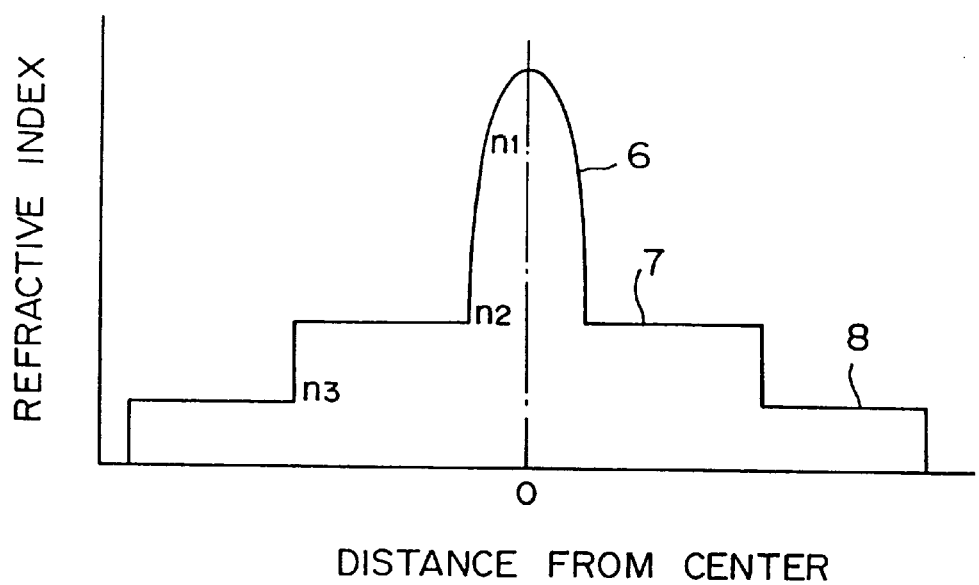
FIGS. 2 and 3 are each a graph showing distribution of the refractive index along a radial direction within a cross section of double-core optical fibers showing a stepwise profile as an ideal case and a disordered profile in a typical prior art case, respectively, with the distance from the center O of the optical fiber as the abscissa and the refractive index as the ordinate.

As is mentioned above, it is desirable or ideal that the distribution profile of the refractive index along a radial direction within a cross section of the optical fiber is stepwise as is illustrated in FIG. 2 which is a graph showing the distribution profile of the refractive index consisting of the portions 6, 7 and 8 corresponding to the center core 12a, side core 12b and cladding layer 12c having the refractive indices n1, n2 and n3, respectively, as an ideal case.

Figure 3:
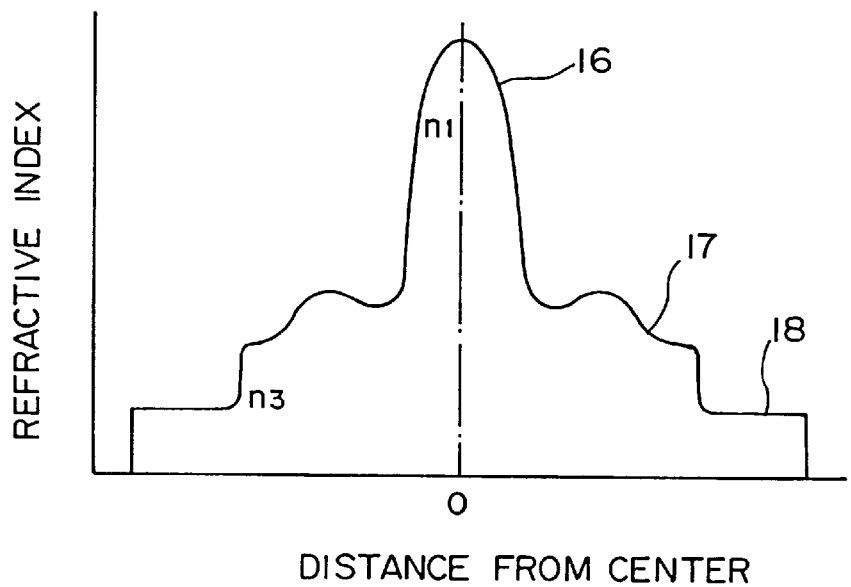

Notwithstanding the above mentioned desirable stepwise profile of the distribution curve of the refractive index as an ideal case, it is usual that the stepwise profile is disordered more or less, in particular, relative to the refractive index of the side core 12b as is shown in FIG. 3 in which the portions 16, 17 and 18 correspond to the center core 12a, side core 12b and cladding layer 12c, respectively. As is shown there, the profile corresponding to the center core portion 16 and the cladding layer portion 18 is not so far from the ideal case shown by the portions 6 and 8, respectively, in FIG. 2 with the refractive indices of n1 and n3, respectively, but the profile corresponding to the side core portion 17 is greatly deformed or disordered to such an extent that the refractive index n2 of the side core 12b can no longer be defined on the graph.

With an object to find a solution for the above described disadvantageous problem, the inventors have conducted extensive investigations to obtain an idea that the above mentioned disordered distribution profile of the refractive index within a cross section of a double-core silica glass optical fiber is a consequence of an inappropriate arrangement of the oxyhydrogen flame burners 13, 14, 15 relative to the rotation axis 10 of the growing porous silica glass body 12 and arrived at an unexpected discovery that the key factor controlling the distribution profile of the refractive index in the side core 12b is the arrangement of the middle burner 14 for the deposition of the silica soot to form the side core 12b relative to the rotating axis 10 leading to completion of the present invention after establishment of the optimum arrangement of the middle burner 14.

Figure 4A:
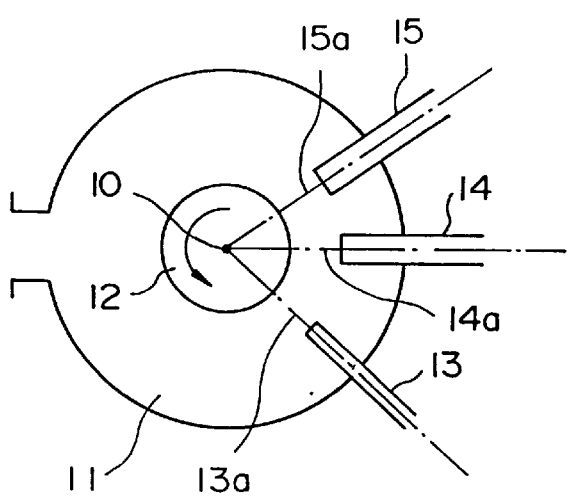
FIGS. 4a and 4b each illustrate the arrangement of the burners in a plan view relative to the rotation axis of the growing porous silica glass body in the prior art and in the invention, respectively.

Namely, it is an established arrangement in a flame hydrolysis apparatus of the prior art for the preparation of a double-core porous silica glass preform that each of the oxyhydrogen flame burners 13, 14, 15 is just directed to the rotating axis 10 of the growing porous silica glass body 12 or, in other words, the rotation axis 10 and an extension of the nozzle axis 14a of the middle burner 14 intersect each with the other making a plane defined by the two axes. This arrangement of the burners 13, 14, 15 is illustrated by a schematic plan view in FIG. 4a in which the extension line of the nozzle axis 13a, 14a or 15a of each of the burners 13, 14, 15 intersects with the rotation axis 10 around which the growing porous silica glass body 12 is rotated in the flame hydrolysis chamber 11.

Figure 4B:
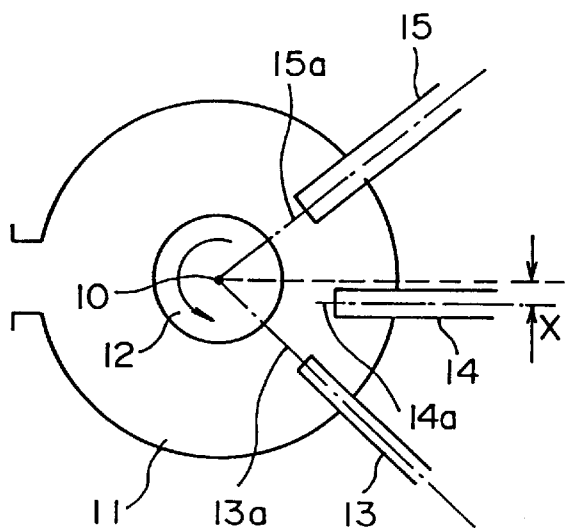

In contrast to the above described conventional arrangement of the burners 13, 14, 15 relative to the rotation axis 10, the unexpected discovery leading to the present invention is that a remarkable improvement can be obtained in the distribution profile of the refractive index along a radial direction within a cross section when the middle burner 14 for the deposition of the side core portion 12b is displaced in a parallel displacement within a horizontal plane in a direction perpendicular to both of the rotation axis 10 of the growing porous silica glass body 12 and the nozzle axis 14a of the burner 14 as is illustrated in FIG. 4b so that the rotation axis 10 and the extension of the nozzle axis 14a of the middle burner 14 are in a relationship of non-parallelism and non-intersection. The distance of horizontal displacement X (see FIG. 4b) is of course an important parameter in order to optimize the desired improvement.

In conducting the process using three burners described above, vapor of a silicon compound such as silicon tetrachloride as a starting material of silica, hydrogen gas as a burnable gas and oxygen gas as a combustion-supporting gas are introduced in each burner either separately or as a mixture. In addition, the gaseous feeds to the lowermost and middle burners for the center core and side core are each admixed with a suitable dopant such as germanium tetrachloride to increase the refractive index of the resultant silica glass in an amount sufficient to give the predetermined refractive indices of n1 and n2 to the center core and side core, respectively.

When a germanium compound is used as a dopant to control the refractive index of the silica glass, it is an accepted understanding that the germanium constituent is contained in the silica glass in the form of fine particles of germanium dioxide $GeO_2$ or in the form of a solid solution of silicon-germanium oxide while the fine particles of germanium dioxide are readily dissipated in the course of the subsequent procedure such as the dehydration treatment of the porous silica glass body to have almost no contribution to the refractive index of the final silica glass body. Accordingly, it can be assumed that modification of the refractive index of the silica glass can be obtained solely by the solid solution of silicon-germanium oxide.

Figure 5:
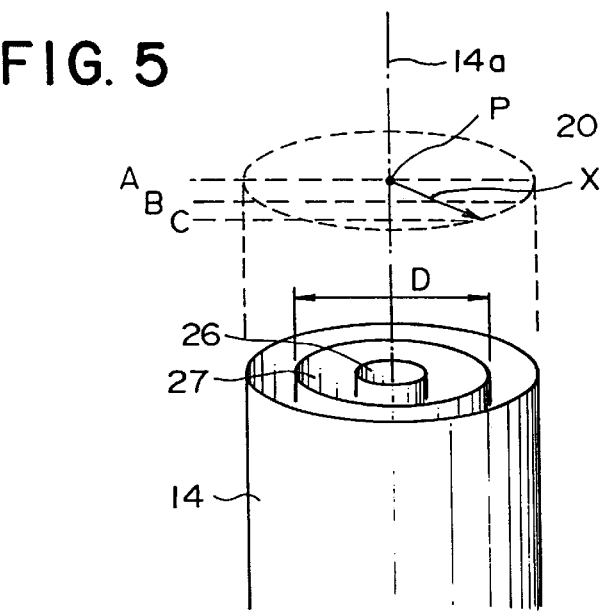
FIG. 5 is a schematic perspective view of the nozzle opening of the concentrically multitubular middle burner.

As is mentioned above, each of the burners 13, 14, 15 or the middle burner 14 is a concentrically multitubular burner, as is illustrated in FIG. 5 by a perspective view, having a circular center nozzle 26 and at least one ringlike nozzle including the ring nozzle 17 surrounding the center nozzle 26 and having a diameter D. When the silica soot formed in the oxyhydrogen flame blown out of the nozzle openings 26, 27 is deposited on a target surface 20, it has been unexpectedly discovered that the concentration of the silicon-germanium oxide solid solution in the silica soot deposit is not uniform but has a distribution varying from point to point. Namely, the concentration distribution of the solid solution along a diameter A on the target surface 20 of soot deposition shown in FIG. 5 is illustrated by the two-peak curve A of FIG. 6 taking the distance from the center P of the soot deposition area as the abscissa. When the concentration of the solid solution is taken along the chord B or C in FIG. 5 at a distance X from the center P of the target area, the distribution curve of the concentration of the solid solution is shown by the curves B and C, respectively, in FIG. 6 for varied ratios of X/D in the range from 0.01 to 0.5 for the curve B and larger than 0.5 for the curve C, respectively. As is shown in the curve B of FIG. 6, the concentration of the solid solution is approximately uniform over a certain range in the soot deposition surface 20. This is presumably the reason that the distribution curve of the refractive index of the optical fiber has a disordered profile shown in FIG. 3 when the middle burner 14 is arranged such that an extension of the nozzle axis 14a intersects with the rotating axis 10 of the growing porous silica glass body 12.

The above described unexpected discovery relative to the concentration distribution of the silicon-germanium oxide solid solution over the silica soot deposition surface led to an idea that the uniformity of the refractive index in the side core portion 12b of the porous silica glass body 12 could be improved as is shown in FIG. 2 when the middle burner 14 is arranged in such a fashion that the extension of the nozzle axis 14a of the burner 14 is displaced in parallel displacement in a horizontal direction perpendicular to both of the rotating axis 10 of the growing porous silica glass body 12 and the nozzle axis 14a of the middle burner 14 as is illustrated in FIG. 4b. The distance X of optimum displacement can be defined in terms of the ratio to the diameter D of the ring nozzle 27, which surrounds the center nozzle 26 and from which hydrogen gas is ejected, the center nozzle 26 being for the ejection of the gaseous silicon compound and outer ring nozzle or nozzles surrounding the first ring nozzle 27 being for the ejection of oxygen gas and, if used, a carrier gas such as argon, such that the value of X/D is in the range from 0.01 to 0.5 assuming that the value of D is in the range from 5 to 15 mm. When the value of X/D is too small, the desired effect for the improvement in the distribution of refractive index can be obtained only insufficiently as is understood from the curve A of FIG. 6 while, when the value of X/D is too large, the concentration of the silicon-germanium oxide solid solution in the silica soot is decreased in addition to the decrease in the density of the silica soot per se resulting in a decrease in the productivity of the process. As to the position of the middle burner 14 within a vertical plane, it is important that the angle made between a horizontal direction and the nozzle axis 14a of the middle burner 14, which should never be directed downwardly, does not exceed 60° in order to facilitate control of the rate of silica soot deposition.

In the following, the improvement obtained according to the present invention is illustrated in more detail by way of an example.

EXAMPLE

A flame hydrolysis chamber was equipped with three oxyhydrogen flame burners including a lowermost burner for the deposition of silica soot to form the center core portion, a middle burner for the deposition of silica soot to form the side core portion and an uppermost burner for the deposition of silica soot to form the cladding layer. These burners were installed with an angle of inclination of 60°, 30° and 0°, respectively, relative to the horizontal direction. Each of the lowermost and uppermost burners was installed in such a fashion that the extension of the nozzle axis intersected with the rotating axis of the porous silica glass body under growing.

Several test runnings were undertaken by using the above mentioned apparatus for the preparation of a porous silica glass preform, in which the position of the middle burner was varied in such a fashion that the ratio of the distance X, by which the extension of the nozzle axis of the burner was displaced in the horizontal direction from the rotating axis of the growing porous silica glass body, to the diameter D of the ring nozzle of the burner, i.e. X/D, was varied from zero to a value exceeding 0.5. The optical fibers prepared from the thus obtained porous silica glass preforms were subjected to the measurement of the refractive index within a cross section to give a distribution curve.

When the value of X/D was in the range from 0.1 to 0.4, a typical distribution curve of the refractive index had a profile as shown in FIG. 7a, in which the refractive index in the side core portion shown by the section 7, though with a small gradient of inclination, had distinct demarcations with the center core and with the cladding layer shown by the sections 6 and 8, respectively. When the value of X/D exceeded 0.5, on the other hand, the curve of refractive index had a profile as shown in FIG. 7b, in which the section 7 for the side core portion, though indicating a relatively uniform refractive index and having distinct demarcations with the sections 6 and 8, was very narrow so that the optical fiber was practically not acceptable. This is presumably due to a great decrease in the density of the silica particles in the silica soot flow just hitting at the growing center core portion.

An optical fiber prepared from a preform obtained with a value of X/D of 0.35 was subjected to the measurement of the zero-dispersion wavelength over a length of 20 km to give the results shown in FIG. 8, from which it is understood that the zero-dispersion wavelength was substantially constant over the whole length of the optical fiber tested.

What is claimed is:

1. In a method for preparing a porous silica glass preform as a precursor of a double-core optical fiber concentrically consisting of a center core, a side core and a cladding layer by flame hydrolysis of a vaporizable silicon compound with or without admixture of a dopant to control the refractive index of the center core, side core and cladding layer using a lowermost burner, a middle burner and an uppermost burner, each burner being a concentrically multitubular burner comprising a center nozzle and at least one ring nozzle surrounding the center nozzle, the burners being positioned one above the other, the lowermost burner producing silica soot which is deposited on and around a growing porous silica glass body rotating about a vertical axis to form the center core, the middle burner producing silica soot which is deposited on and around the growing porous silica glass body as a center core to form a side core and the uppermost burner producing silica soot which is deposited on and around the growing porous silica glass body to form a cladding layer, the improvement which comprises setting the middle burner for the side core at such a position that the extension of the nozzle axis thereof does not intersect with the axis of rotation of the growing porous silica glass body with a displacement distance defined by the value X/D which is in the range from 0.01 to 0.5, in which D is the diameter of the ring nozzle of the concentrically multitubular middle burner surrounding the center nozzle and X is the distance of the displacement in a horizontal direction perpendicular to each of the rotating axis of the growing porous silica glass body and the nozzle axis of the middle burner, the extension of the nozzle axis of each of the lowermost and uppermost burners intersecting with the axis of rotation of the growing porous silica glass body.

2. The improvement as claimed in claim 1 in which the extension of the nozzle axis of the middle burner makes an angle not exceeding 60° with the horizontal direction.

* * * * *